United States Patent
Rottenkolber

[11] 3,976,380
[45] Aug. 24, 1976

[54] HOLOGRAPHIC ARRANGEMENT FOR TESTING MATERIALS WITHOUT DESTROYING SAME

[75] Inventors: Hans Rottenkolber, Amerang; Hans Steinbichler, Riedering, both of Germany

[73] Assignee: Opto-Produkte AG, Zurich, Switzerland

[22] Filed: Mar. 11, 1974

[21] Appl. No.: 450,106

[30] Foreign Application Priority Data
Mar. 13, 1973  Germany.......................... 2312435

[52] U.S. Cl................................ 356/109; 350/3.5
[51] Int. Cl.²........................................... G01B 9/02
[58] Field of Search....................... 356/109, 106 R; 350/3.5

[56] References Cited
UNITED STATES PATENTS
3,582,176   6/1971   Mathisen ............................ 350/3.5
3,644,047   2/1972   Brown et al. ....................... 356/109

OTHER PUBLICATIONS
Abramson, N., "The Holo–Diagram IV ... Hologram Interferometry;" Applied Optics vol. 10 No. 9 2155, 9/71.

*Primary Examiner*—John K. Corbin
*Assistant Examiner*—Conrad Clark
*Attorney, Agent, or Firm*—Walter Becker

[57] ABSTRACT

A method and apparatus for nondestructive testing of articles by holography in which light beams from a virtual point source of laser light and from an observation point are reflected by a reflector toward the same point on the object being checked. The light beams when extended beyond the reflector intersect on an ellipsoid having the point source and the observation point as foci. A plate having a hologram of the article is interposed between the observation point and the reflector and flaws in the object being tested show up on the plate as interference lines when the object is modified in shape by a mass influence such as a temperature change, or a change in pressure thereon, or by vibrations.

7 Claims, 3 Drawing Figures

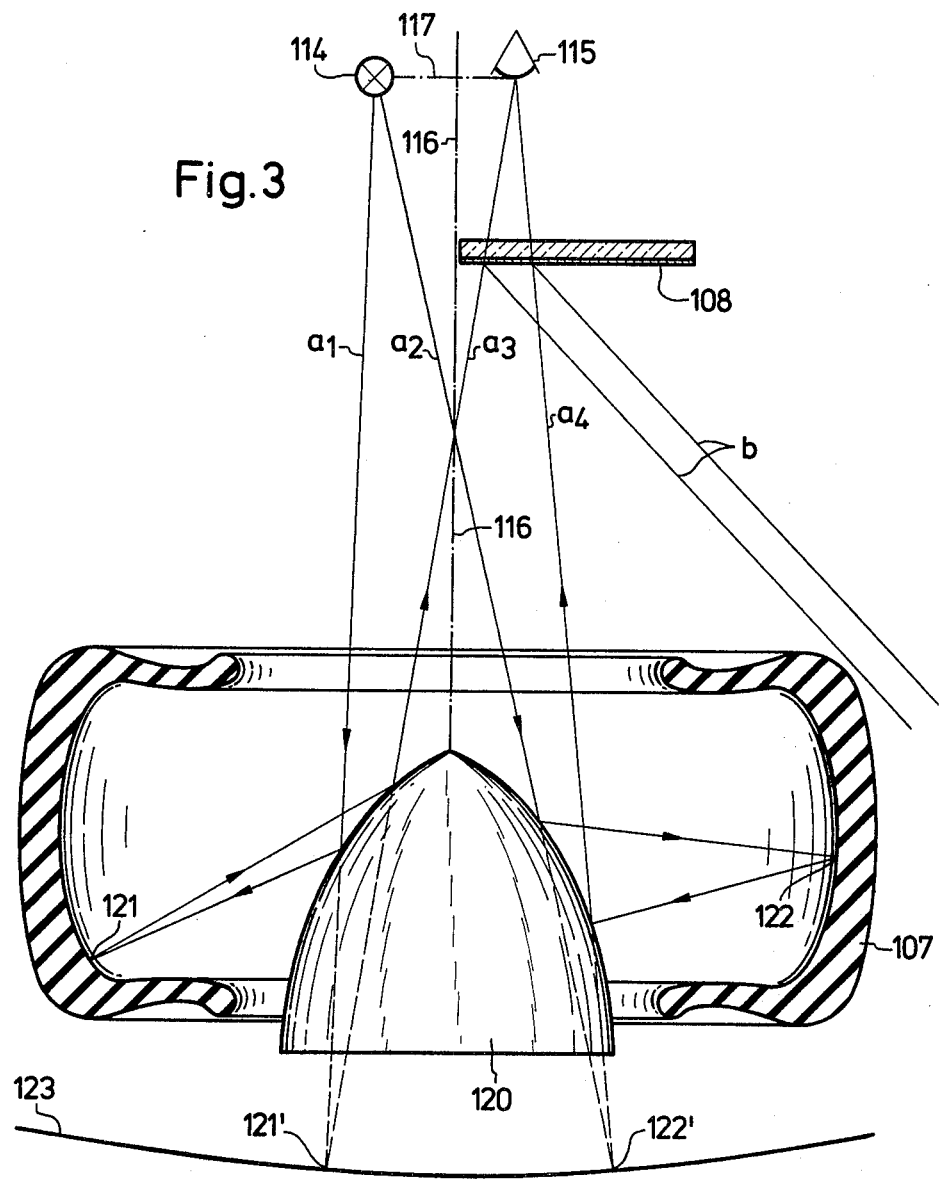

HOLOGRAPHIC ARRANGEMENT FOR TESTING MATERIALS WITHOUT DESTROYING SAME

The present invention relates to a holographic arrangement for measuring irregular deformations. By "irregular deformations" are meant such deformations which do not represent a uniform change in the location of all points of the surface of the object to be measured but are only a deformation of such individual points or areas of said surface. An example of a regular deformation is the increase in the volume of a body as it is caused by a heat extension, for instance of a metallic object, whereas an irregular deformation is a deformation which is caused for instance by a casting error or a shrinkage cavity of such metallic article at a limited individual place.

A considerable economic interest exists in connection with testing of materials or at the outlet control of finished industrial products to ascertain such irregular deformations as they occur under certain conditions for instance heating, without damaging the object or destroying same as it is unavoidable with customary material testing methods and by which to a greater extent also good workpieces or products are destroyed.

It is known for such testing which does not destroy the article to be tested, to employ methods of the holographic interferometry. A hologram is prepared by the object in its unchanged starting position and this hologram is compared with a hologram while being superimposed with such hologram, which was taken or recorded of the same object in the same position but in a condition bringing about a change in its surface. In this way an interference sample is obtained in which the change and in particular the irregular changes can be read and measured. In German Auslegeschrift No. 1 906 511 there is described a method and arrangement which is intended for testing pneumatic tires concerning faults. According to this method, a hologram of an inflated tire is recorded shortly after the inflation of the tire and sometimes later another hologram is recorded, and these two holograms are compared with each other while the holograms are superimposed upon each other. From the resulting interference sample, faults in the structure of the tire can be made visible which shows up in the form of otherwise known visible bulges. The possibility by means of holographic interferometry to measure the changes in shape of three dimensional objects was first described by Hildebrand and Haines in "Optics" 5 (1966 page 172/173) and the same authors in "Optics" 5 (1966 pages 595–602).

With these abovementioned methods it is, however, very disturbing that the regular as well as irregular deformation brings about interference lines which can be coordinated only under considerable difficulties. This means that the looked-for faulty area or faulty source can in view of such interference pictures be identified and measured only under difficulties.

It is therefore an object of the present invention to suppress the interference lines produced by the regular deformation so that in the interference picture there will be visible substantially only those lines which are associated with an irregular deformation.

These and other objects and advantages of the invention will appear more clearly from the following specification in connection with the accompanying drawings, in which:

FIG. 1 diagrammaticaly shows a holographic arrangement in which the object is shown perspectively.

FIG. 3 represents an illustration of holographic arrangement with an object surrounding a body of rotation.

Figure 1:
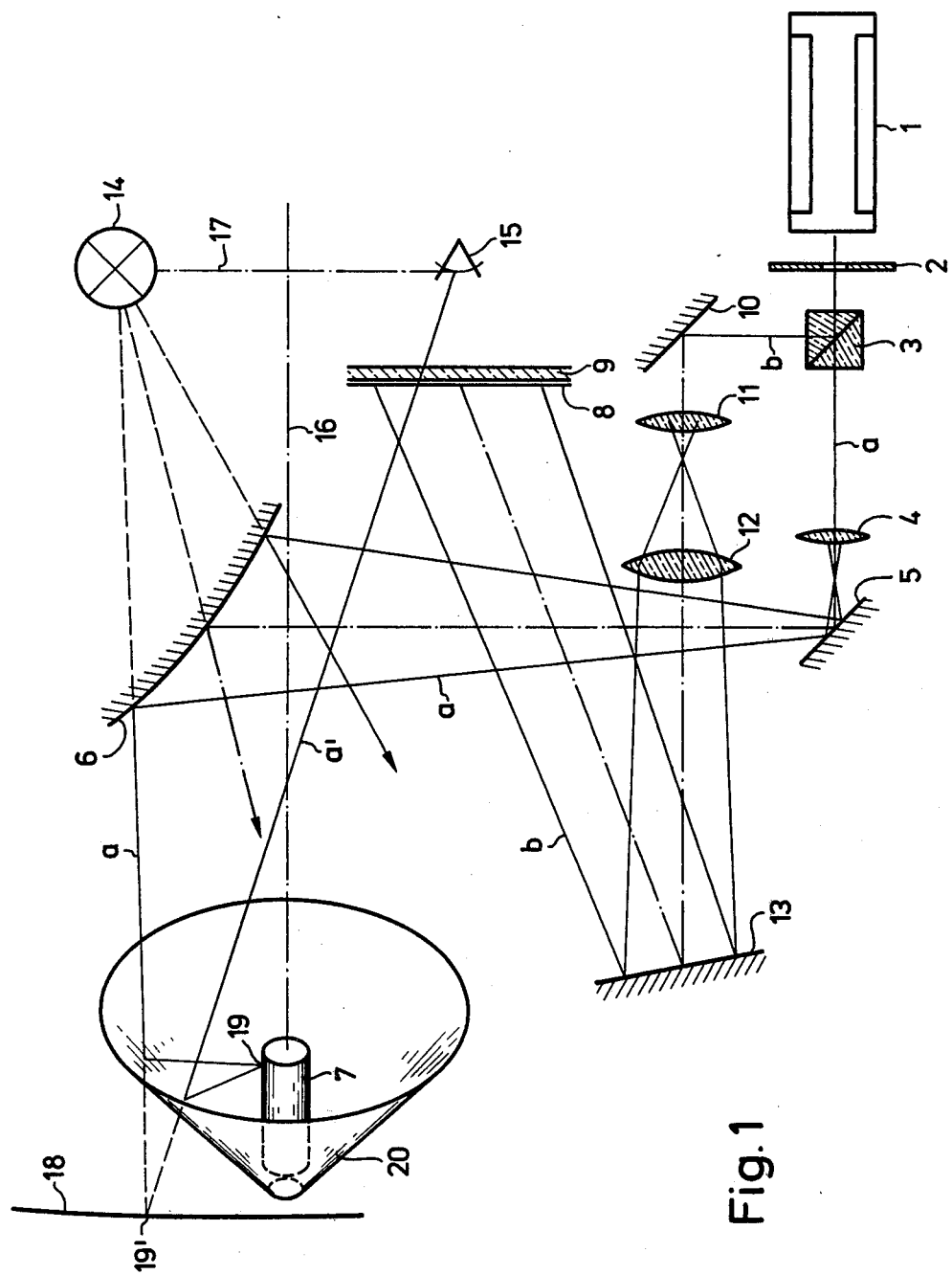

The holographic arrangement according to the invention for measuring irregular deformations is characterized primarily in that such formed elements for deviating light beams hitting the object and reflected thereby are provided that surfaces for which the optical distance of the light from the light source via the object point to the point of observation is constant, said surfaces being adapted to the shape of the surface of the object to be checked or are adapted to the regular deformation thereof.

The elements for deviating the light beams may be adapted only to the component of the regular deformation in the direction of the angle bisector between the illuminating beam and the observation beam between light source, the object point and the observation point. This angle bisector may be determined by the central vertical on the connecting line between light source or virtual light source illuminating the object on one hand and the point of observation on the other hand. Light source and point of observation represent the foacl points of a family of surfaces in the form of ellipsoids which form the locus for equally long lengths of travel or distances between the light source—point on the surface of the object'and point of observation. This means that all points or their image are located on the same surface of that ellipsoid which has its focal points in the light source and in the point of observation and the apex of which determined by its short axis is located in the direction toward the object. In view of this arrangement, it will be realized that the regular deformation can generate no, or hardly any interference lines in the comparison hologram and that only the irregular deformations can be observed in interference lines. If the light source and the point of observation coincide, the surfaces of the same optical length of travel are spheres.

An element for deviating the light beam may be a cone with an inner mirror when the surface to be checked is cylindrical or nearly conical, is conical or nearly conical.

Furthermore, an element for deviating the light beams may be a cone with a mirror surface on the outside when the surface of the object to be checked forms the inner surface of a hollow cylindrical or nearly hollow cylindrical body or of a conical or nearly conical body.

It is not necessary that a very high degree of adaptation is realized between the element of deviation and the surface of the object but it will suffice that the interference lines generated by the regular deformation of the object will be suppressed to such an extent that only a few for instance from one to three appear in the interference picture or only that an effortless and unequivocal coordination of the lines of irregular deformation will be possible.

The holographic arrangement according to the invention may be employed successfully for testing materials without destroying the same for instance in greater quantities, by unskilled personnel with the aid of fixedly arranged devices. Since a very large object space is available, nearly any desired methods for creating the surface deformation may be employed for instance the employment of heat or a change in the pressure conditions between object and surrounding medium, and also objects of major dimensions may be checked. The arrangement of the round or concave mirror reflector additionally makes it possible to cover the object on all sides by a single hologram.

Referring now to the drawings in detail, the light beam emitted by the laser 1, for instance a He—Ne-laser with a wave length of 632.8 nm passes through a shutter 2 and subsequently in the beam divider 3 is split into an object beam $a$ and into a reference beam $b$. The object beam after being broadened by the objective 4 is deviated at the mirror 6 and illuminates the object 7 through the intervention of the sightly convex mirror 6. The light which is diffusely reflected by the object 7, illustrated in a selected beam $a'$, passes to the photo layer 8 on plate 9. The reference beam $b$ is deviated at the mirror 10 and subsequently by the lense system 11, 12 is widened parallel or in a spread manner. After being deviated at the mirror 13 it illuminates directly the photo layer 8. On this photo layer there will be recorded the interference field which is generated by the reference beam $b$ and by the light which from the object 7 falls in in a diffused manner. The illumination of the photo layer 8 timewise is controlled by the shutter 2. The photo layer 8 has a resolving capability of in excess of 1000 lines per millimeter. In the picture fixed in the photo layer 8, the optical information originating with the object is stored as interference field which means it has the hologram of the object 7. If this hologram is illuminated only with the reference beam $b$, the virtual picture of the object 7 which was generated by the diffraction of the reference beam b at the interference field can be observed at its original place.

On the point of intersection of the rearwardly extended beam path of the object beams a deviated by the mirror 6, there is in point 14 provided the virtual light source.

Behind the plate 9 there may be located the observation point 15. The angle factor between the illuminating beam $a$ and observation beam $a'$ determines the location of the object 7. In the embodiment illustrated, the angle intersector equals the central vertical 16 on the connecting line 17 between the virtual light source 14 and the observation point 15. The object will then be located on the minor axis of a family of ellipsoids 18 the focal points of which are formed by the light source 14 and the observation point 15, while the locus for equally long distances are formed by the light source 14 — point 19 on the surface of object 7 — and the point of observation 15. The object point 19, in the embodiment of FIG. 1 is replaced by the virtual point 19'. The path of the beam a from the light source 1 or the virtual light source 14 to the object point 19 or 19' and its diffused reflection thereof as beam $a'$ to the point of observation 15 describes this length of distance.

Around the object 7 which in this instance is a cylindrical body having its axis located in the central vertical 16 is coaxially therewith provided an open straight hollow truncated cone 20 having an inner mirror surface, and having its base surface arranged in the direction toward the points 14 and 15.

Figure 2:
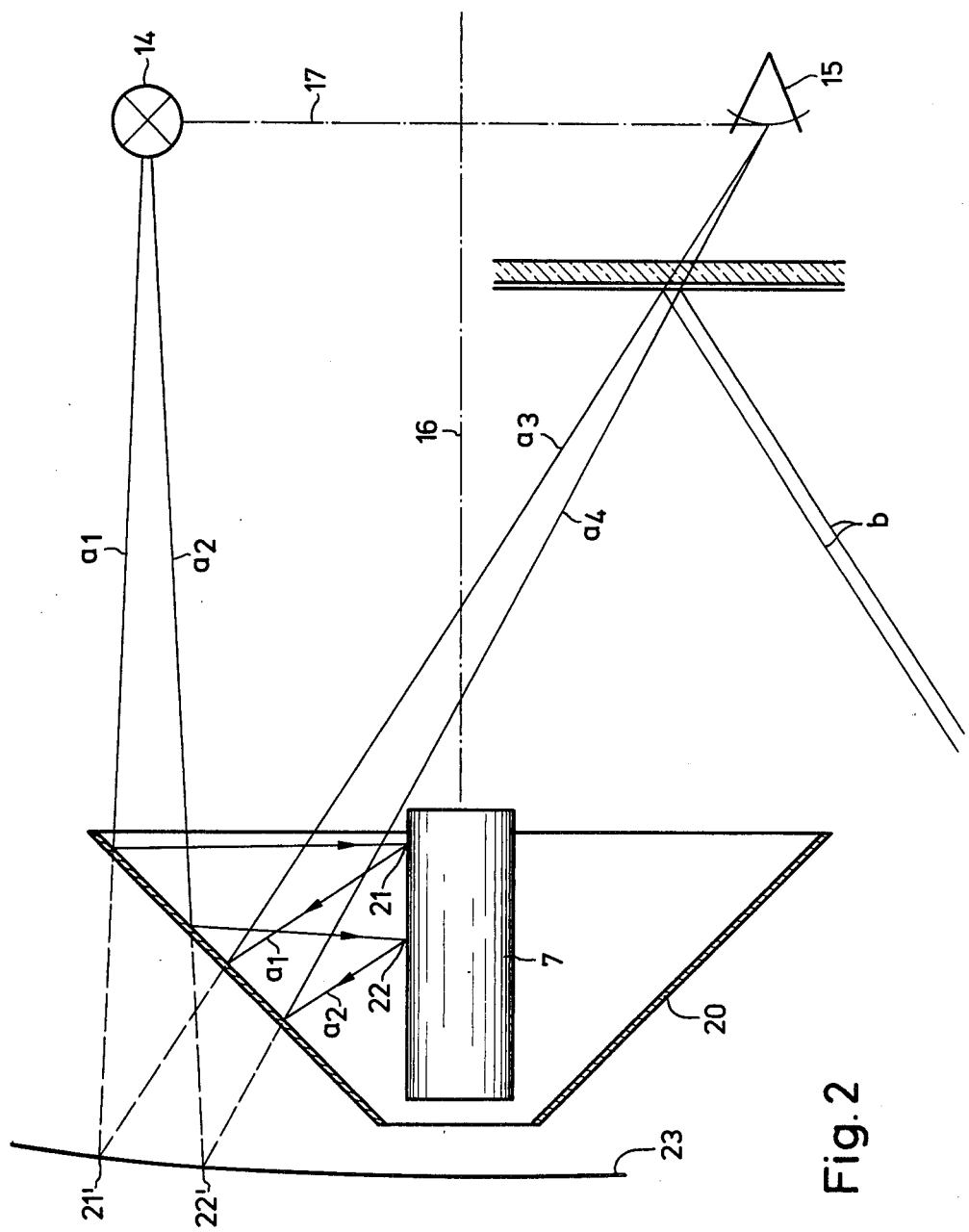
FIG. 2 represents an illustration of the path of rays or beams on the object.

As will be evident from FIG. 2, the object beams 18 and 19 which extend in the direction from the virtual light source 14 pass on their way from the mirror 6 to the point of observation via the inner wall of the hollow truncated cone and the surface of the object over the same travel length while they are reflected twice between the hollow truncated cone and the surface of the object.

FIG. 2 shows a section through the hollow truncated cone 20 with the object 7 therein. There are shown two partial beams a1 and a2 of the object beam a as originated with the virtual light source 14. These partial beams hit upon the mirrored inner surface of the truncated cone and by said mirrored inner surface are deviated to the points 21 and 22 on the surface of the object 7 and are reflected from here as diffused light, which in this instance is illustrated as beams $a_3$ and $a_4$. These beams pertain to the beam selected by the points of the observer which point is located in the point 15 of observation. The virtual reflection points 21' and 22' of the beams $a_1$ and $a_2$ are located on the same ellipsoid 23 the focal points of which are represented by the virtual light source 14 and the observation point 15. These virtual reflection points 21 and 22 therefore move from point 14 via point 21, 21' to point 15 and from point 14 via point 22 or 22' to point 15 over a path having the same length.

Thus, the surfaces for which the optical travel length of the light beam from the light source 14 via the object point 21 or 22 up to the observation point 15 is constant, are adapted to the checked surface of the object or when uniform cylindrical deformation is adapted to the checked surface of the object.

If, however, a surface point of the object 7 is displaced irregularly, it will be appreciated that with the exception of that instance in which the displacement is effected within the surface of the object there is obtained a change in the optical traveling length from point 14 via said object point to point 15 which change deviates from the regular change in the optical traveling length. Under these circumstances, an interference between the hologram of the unchanged condition and of the changed condition occurs which is expressed in different interference lines while only these interference lines appear in the interference picture. Thus irregular object changes become visible in the hologram without the regular interference lines which otherwise appear when the conical mirror 20 is omitted and which would destroy the interference which indicate the partial irregular change in the object 7. The recognizing of irregular changes in the position of points and groups of points in the surface of the objects and the measuring thereof is thus possible without any difficulties.

Automatic changes in the object 7 which means cover its entire surface uniformly as for instance during a heat extension of the object or a change in its volume in view of changes in pressure conditions, relative to the surrounding thereof do not bring about any disturbance of the recording of the particular changes in Position of individual points or small ranges in the surface of the object in the interference picture. This is due to the fact that the general change in shape generates a position of all surface points for which the change in the optical traveling length light source—surface point — point of observation—is either equal to or nearly equal so that no or only very few interference lines are formed.

The body illustrated as object 7 in the drawing may for instance be formed by a cylinder of cast metal which can be checked as to the presence of covered cavities in the case. Its hologram is first obtained in cold condition while illuminating the photo layer 8 with object and reference beam. Subsequently by conducted heat or radiation the object 7 is heated. The interference picture of its thus recorded hologram in the photo layer 8 with the recordings recorded in the starting position of the object will when no casting errors or flaws are present have no or only very small number of interference lines. Flaws in the cast are clearly indicated as to position and extension by the interference lines. The change in form may furthermore be created by mechanically charging the object or by the starting of oscillations or by crawling of the object.

FIG. 3 shows a diagramatic representation of a holographic arrangement wherein the object surrounds the body of rotation and having reference numeral designation thereof increased by 100 over those reference numeral designations provided in FIG. 2.

It is, of course, to be understood that the present invention is, by no means, limited to the particular showing in the drawings but also comprises any modifications within the scope of the appended claims.

What is claimed is:

1. A holographic arrangement for measuring irregular deformations, comprising a light source and a body of rotation located in concentric relationship with respect to an object and having a reflecting surface which corresponds to the object in a simplified form and is adapted to reflect rays which come from a virtual light source, are incident on the object, are reflected from the latter and pass through an observation point and whose virtual points of reflection lie on an ellipsoid whose focuses coincide with the virtual light source and the observation point, in the case of which the object lies on a median perpendicular of a line connecting the light source and the observation point.

2. A holographic arrangement in accordance with claim 1 in which the body of rotation surrounds the object.

3. A holographic arrangement in accordance with claim 1 in which the object surrounds the body of rotation.

4. A holographic arrangement in accordance with claim 1 in which the body of rotation is a cone.

5. The method of nondestructive checking only for measuring irregular deformation of objects having surfaces thereon being checked which comprises in combination; establishing a virtual point source of laser beam light, establishing an observation point, placing the object with the axis of the said surface on the perpendicular bisector to the line joining said points, and arranging a reflector coaxially with the said surface with a reflecting surface so disposed that the extensions of a first light beam from the point source to the reflector and reflecting therefrom to a certain point on the said surface and a second beam from the observation point to the reflector and reflecting therefrom to the same point on the said surface will intersect on an ellipsoid having foci at said point source and said observation point.

6. The method in combination according to claim 5 which includes interposing a plate between said observation point and said reflector which has therein a hologram of an undistorted object otherwise substantially identical with the object being checked, and subjecting the article being checked to a mass influence tending to modify the shape thereof whereby particularly flaws in the object will be revealed only as irregular deformations represented in interference regions on said plate.

7. The method according to claim 5 which includes interposing a plate between said observation point and said reflector which has therein a hologram of the undistorted object being checked, and subjecting the object being checked to an influence tending to modify the shape thereof whereby flaws in the object will be revealed as interference regions on said plate.

* * * * *